Figure 1:
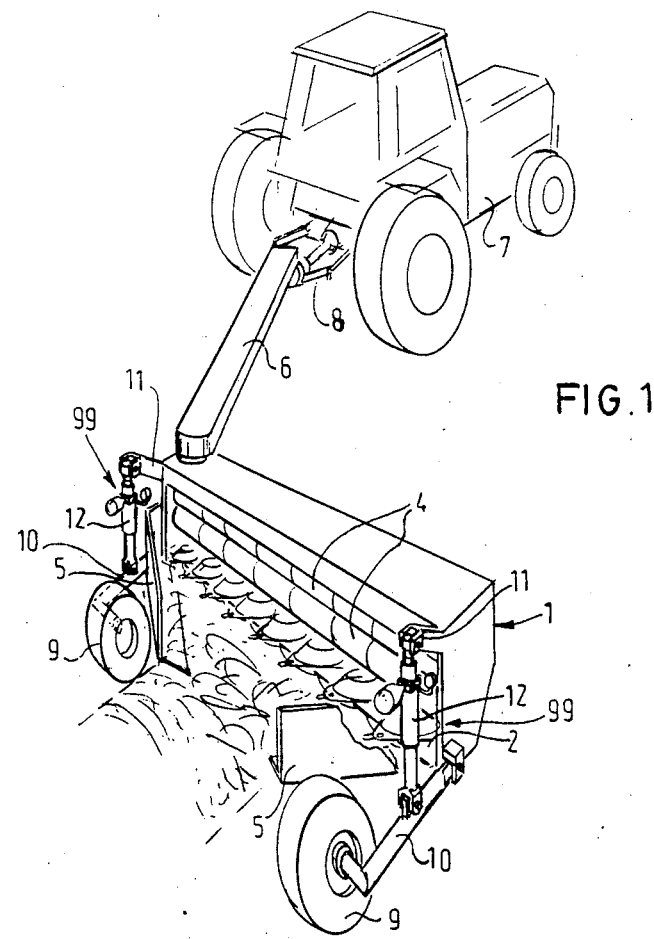

United States Patent [19]

Mijnders

[11] Patent Number: 4,923,014
[45] Date of Patent: May 8, 1990

[54] AGRICULTURAL IMPLEMENT WITH GAS SPRINGS AND CONTROL

[75] Inventor: Gijsbert J. Mijnders, Nieuw-Vennep, Netherlands

[73] Assignee: Multinorm B.V., Netherlands

[21] Appl. No.: 683,615

[22] Filed: Dec. 19, 1984

[30] Foreign Application Priority Data

Dec. 22, 1983 [NL] Netherlands .......................... 8304410
Jul. 25, 1984 [NL] Netherlands .......................... 8402348

[51] Int. Cl.$^5$ .............................................. A01B 63/16
[52] U.S. Cl. ......................................... 172/2; 56/10.2; 172/255; 172/260.5; 267/64.16; 267/64.28
[58] Field of Search ............... 280/6 R, 707, 772, 689, 280/714; 172/2, 255, 324, 414, 679, 4, 5, 260.5, 467, 500, 605, 663, 664, 668; 56/10.2, DIG. 10, DIG. 15; 267/64.11, 64.16, 64.25, 64.28; 188/314

[56] References Cited

U.S. PATENT DOCUMENTS

| | | | |
|---|---|---|---|
| 3,323,810 | 6/1967 | Klein | 267/64.16 X |
| 3,434,270 | 3/1969 | Gaunt et al. | 56/10.2 |
| 3,477,733 | 11/1969 | Gottschalk | 280/6 R |
| 3,623,304 | 11/1971 | Molzahn | 56/10.2 X |
| 3,869,861 | 3/1975 | Case | 267/64.11 X |
| 4,050,704 | 9/1977 | Duca et al. | 280/707 X |
| 4,050,710 | 9/1977 | Flaig | 280/707 X |
| 4,091,897 | 5/1978 | Andrepont | 188/314 |
| 4,229,931 | 10/1980 | Schlueter et al. | 56/10.2 |
| 4,361,346 | 11/1982 | Harris | 280/707 |
| 4,512,589 | 4/1985 | Ambrose et al. | 280/6 R |

FOREIGN PATENT DOCUMENTS

| | | | |
|---|---|---|---|
| 3217786 | 11/1983 | Fed. Rep. of Germany | 172/2 |
| 56-167509 | 12/1981 | Japan | 280/707 |
| 546312 | 5/1977 | U.S.S.R. | 172/2 |

*Primary Examiner*—Richard T. Stouffer
*Attorney, Agent, or Firm*—Watson, Cole, Grindle & Watson

[57] ABSTRACT

An agricultural implement is provided with trailing swing arms, each of which has a trailing wheel. Each swing arm is provided with a lifting device in the form of a piston operating in a cylinder. This lifting device establishes the height at which the implement is supported relative to the ground. Each swing arm is also provided with a gas spring in the form of an upper piston operating in a cylinder to control the pressure of the implement against the ground surface despite undulations in the surface upon which the wheels engage. The lifting devices and the gas springs operate in conjunction with each other to establish substantially uniform pressure of the implement against the ground over the transverse width of the implement. A control device controls the pressures prevailing in the gas springs, which pressures may be different.

4 Claims, 11 Drawing Sheets

AGRICULTURAL IMPLEMENT WITH GAS SPRINGS AND CONTROL

The invention relates to a vehicle, more particularly, an agricultural machine comprising a frame, at least one ground wheel and an implement, said wheel or said implement being suspended by means of springs to the frame.

With a vehicle of the kind set forth in the preamble the implement should accurately follow the ground, and moreover, have a constant ground pressure along the width of the implement for uniformly carrying out the work. The vehicle if often guided in an inclined position in front of or behind a tractor or the like. Due to transverse displacements of the center of gravity of the agricultural machine the implement does not have a constant ground pressure along the width of the vehicle. Even in cavities or on bosses the springs of the implement should ensure a constant ground pressure.

An additional problem is involved in the difference of weight of a clean and a fouled agricultural machine, which is furthermore attended by the problem of the changed ground pressure.

So far the conventional design of an agricultural machine comprises fixed helical springs. These fixed helical springs could not solve any of the aforesaid problems.

The invention has for its object to obviate the aforesaid inconveniences and to provide a vehicle which is distinguished in that each ground wheel is suspended by means of a gas spring to the frame in which spring the prevailing gas pressure may differ from the gas pressure prevailing in a further gas spring.

Preferably means are provided for controlling the pressure prevailing in the gas springs.

By using the spring structure described above the springs can be separately set with a given spring pressure so that a constant ground pressure can yet be maintained for a fouled agricultural machine drawn or propelled in an inclined position.

Moreover, the spring characteristic may be progressive, which results in that the differences in a fouled or a clean machine are approximately the same when the machine runs through a cavity in the ground or across a stone.

Furthermore a vehicle having a drawbar pivotable about a vertical axis for attachment to a tractor or the like preferably comprises means for detecting the angle between the drawbar and the frame, which means control the control-means.

Preferably the angle-detecting means comprise at least one curve element added to the drawbar.

In a first preferred embodiment the gas pressure accumulator communicates with a hydraulic spring cylinder arranged between a ground wheel and the frame. The movements of the ground wheel produce a volume variation in the spring cylinder, which is compensated for by the gas accumulator. The setting of the desired spring characteristic of each ground wheel is thus simplified by supplying more or less fluid to the hydraulic spring cylinder.

In a first preferred embodiment a hydraulic height setting cylinder is arranged between the ground wheel and the frame for controlling the height of the frame relative to the wheel or ground respectively.

The height setting cylinders of the wheels are preferably in series so that the displacement of the piston in one cylinder is uniformly transferred to that of the other cylinder.

In a first embodiment the spring and the height setting cylinders are arranged between a frame part and a carrying arm of the ground wheel pivotally coupled with the frame, it being preferred to interconnect the head ends of the spring and the height setting cylinders. Since in this embodiment, when the frame is lifted, the spring cylinder contributes to the lift, the stroke of the second cylinder and hence the length thereof can be limited.

In a first preferred embodiment a switching block for a common feed is arranged between the ends of the cylinders, where the gas accumulator formed by a pressure vessel having a fluid and gas section separated by a diaphragm is connected by the fluid section.

In a further embodiment the angle-detecting means control curve elements, gas control-valves for controlling the gas pressure prevailing in the gas springs in alternative designs of gas springs on the left-hand and the right-hand side respectively of the vehicle.

Some features of the first embodiment are also included in the second embodiment.

The above-mentioned and further features of the first and second embodiments of the invention will be set out with reference to a drawing.

Figure 2:
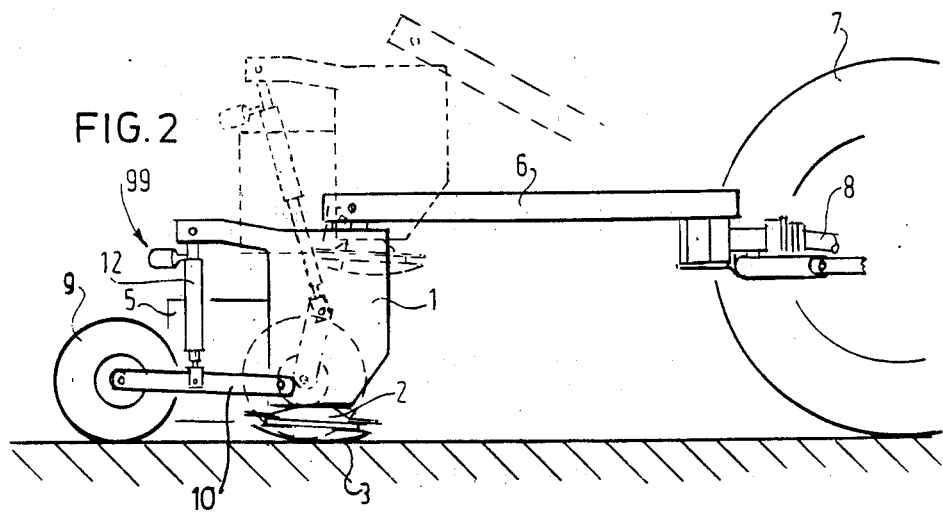
Figure 3:
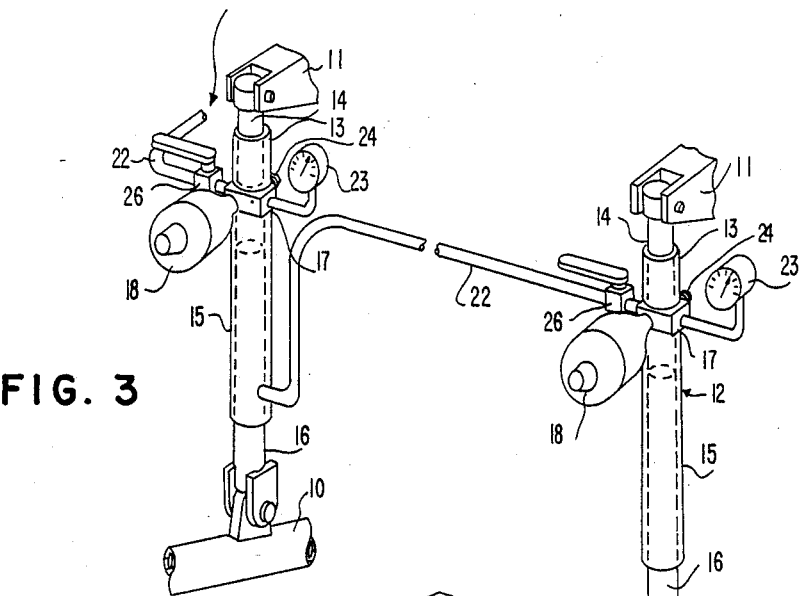
Figure 4:
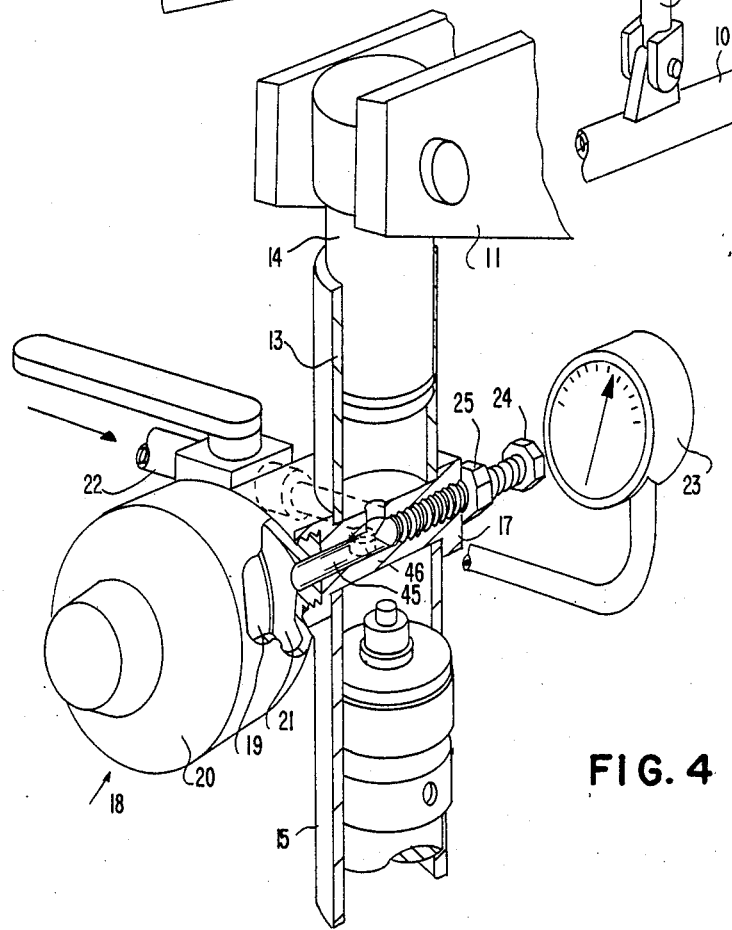
Figure 5:
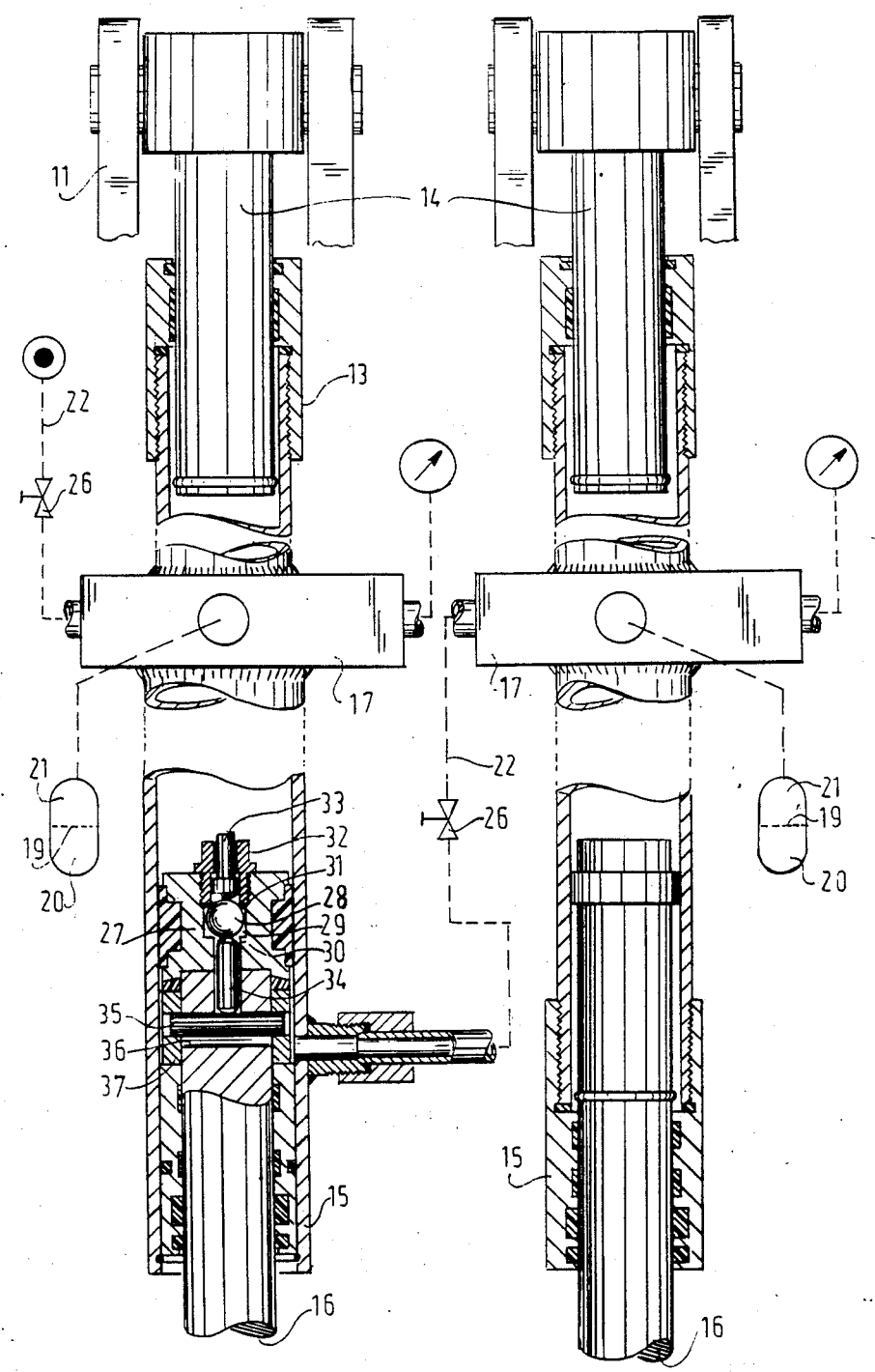
Figure 6:
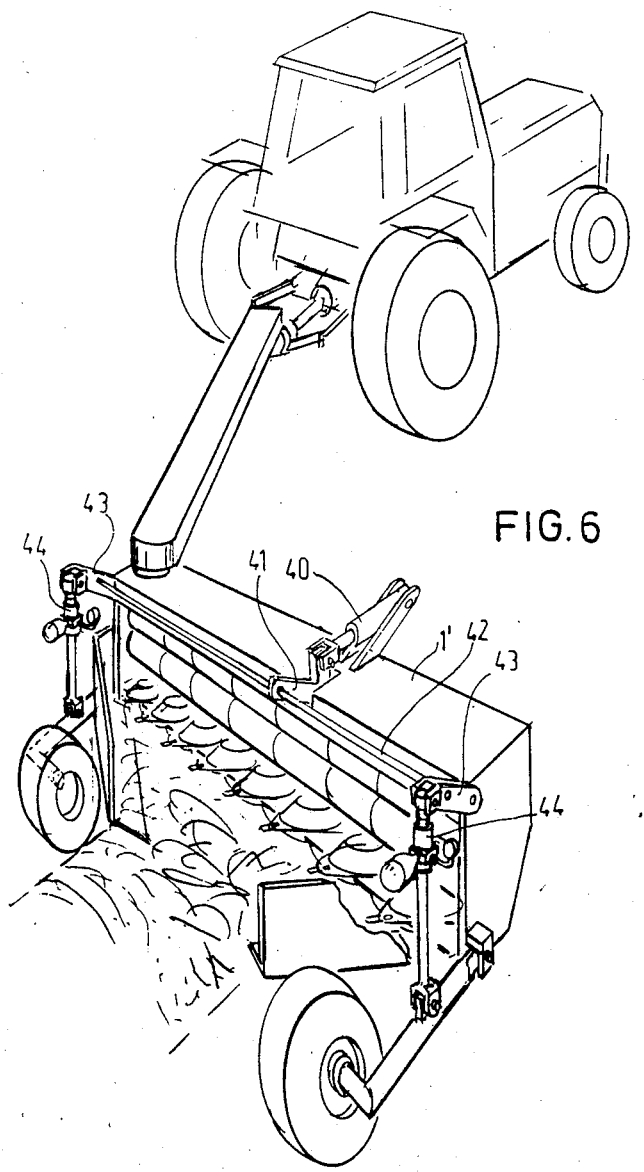
Figure 7:
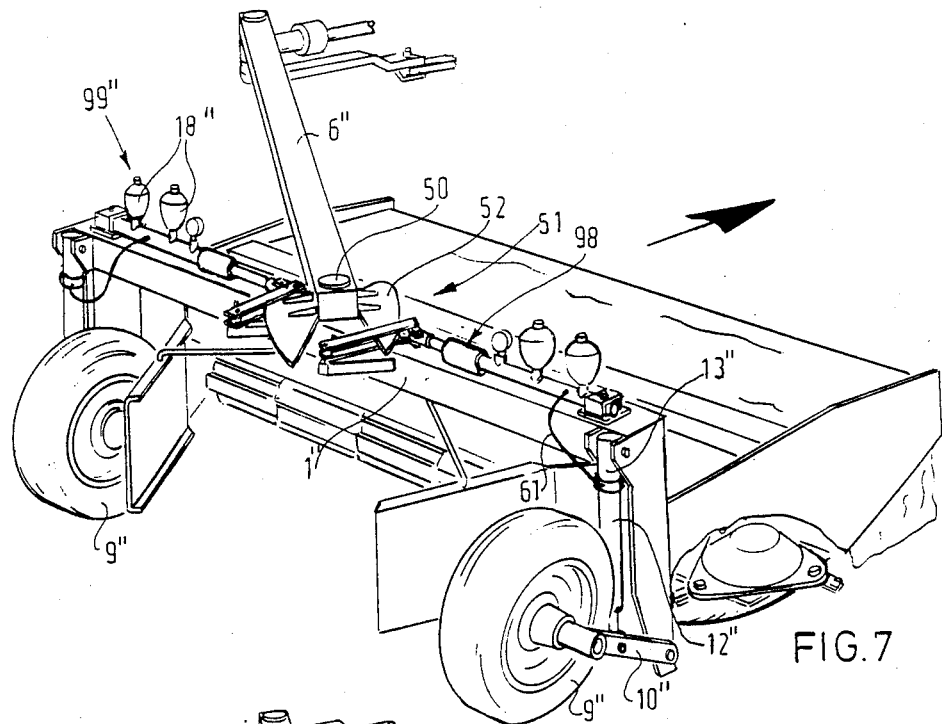
Figure 8:
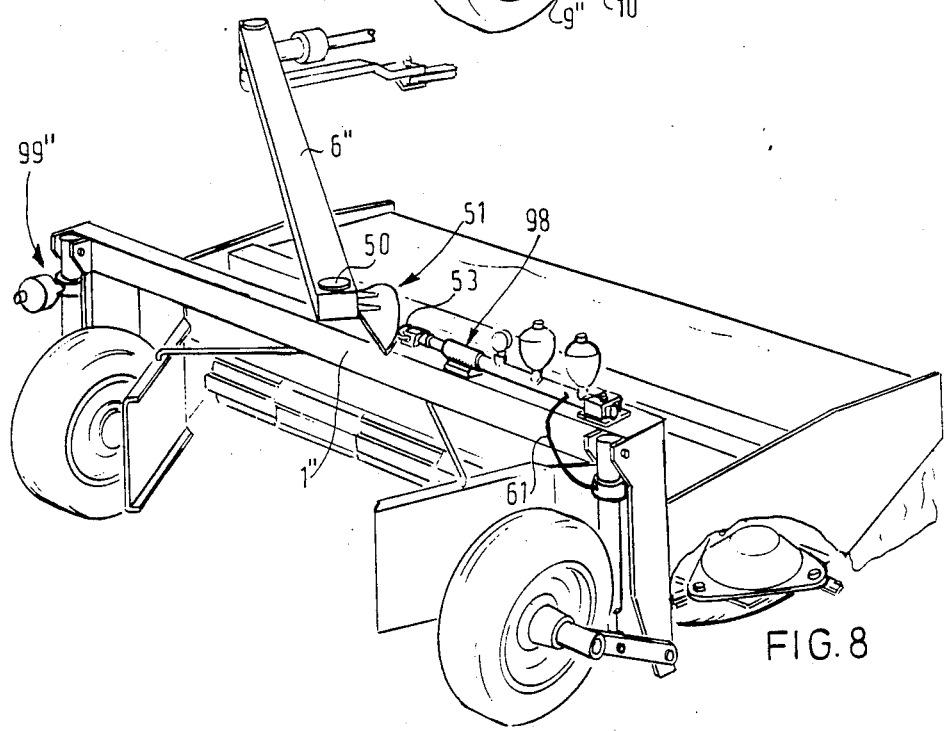
Figure 9:
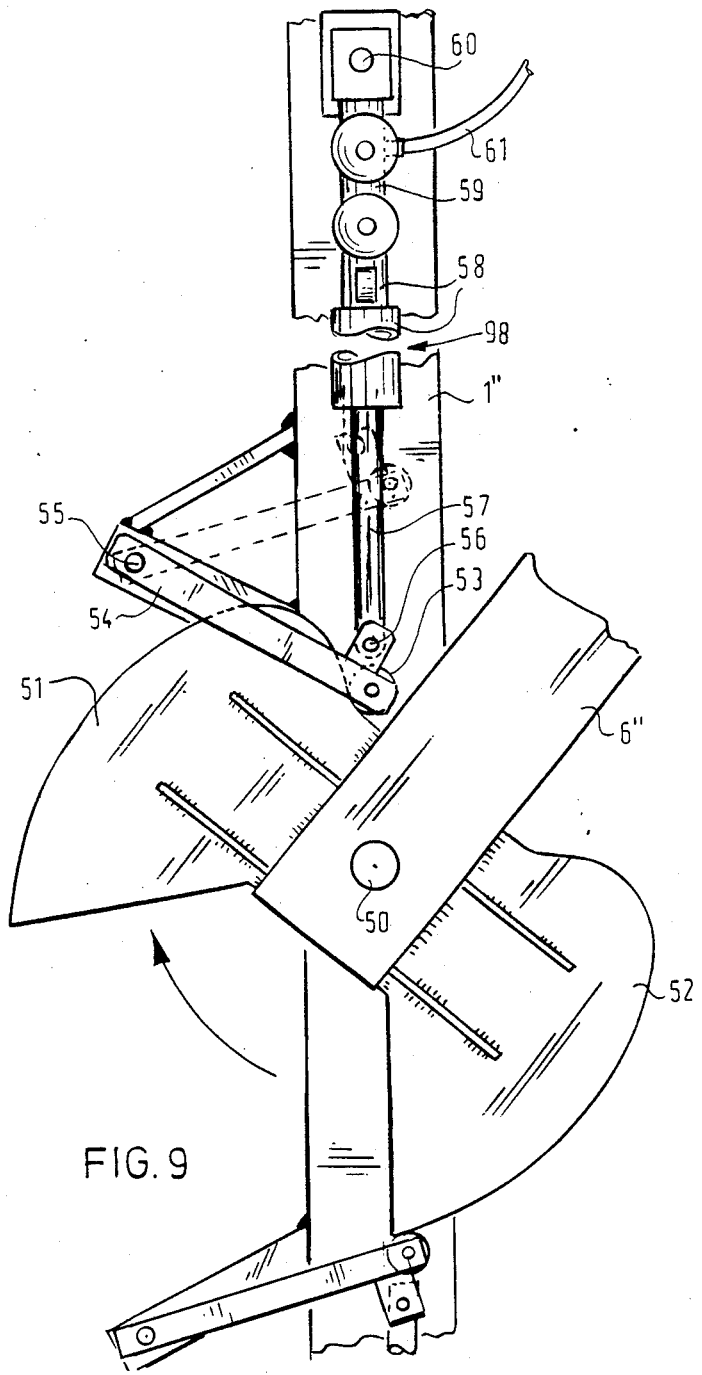
Figure 10:
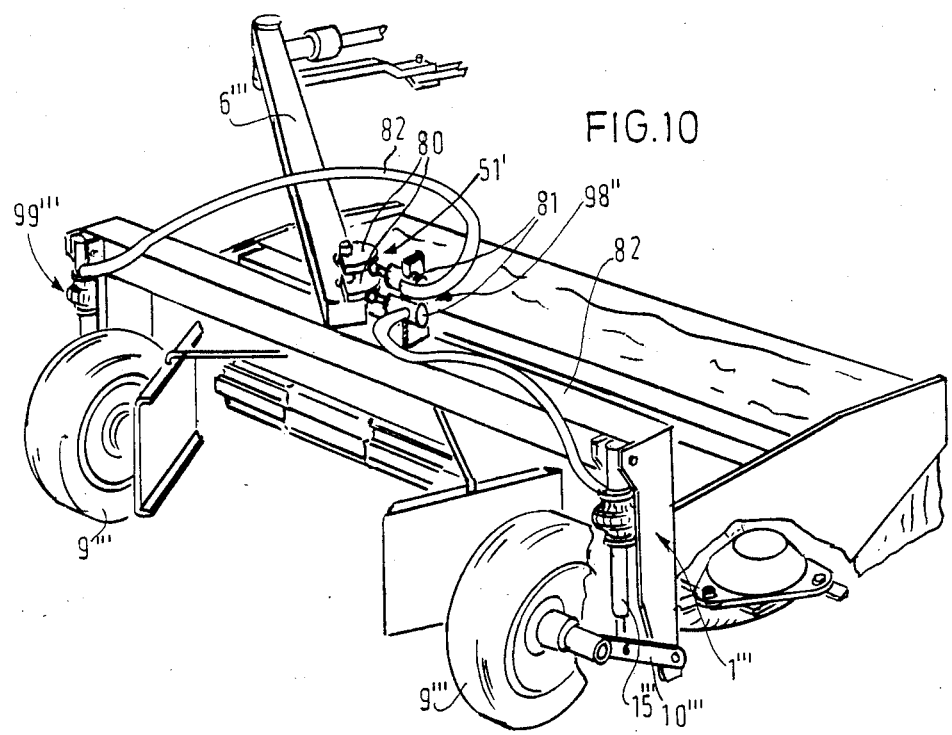
Figure 11:
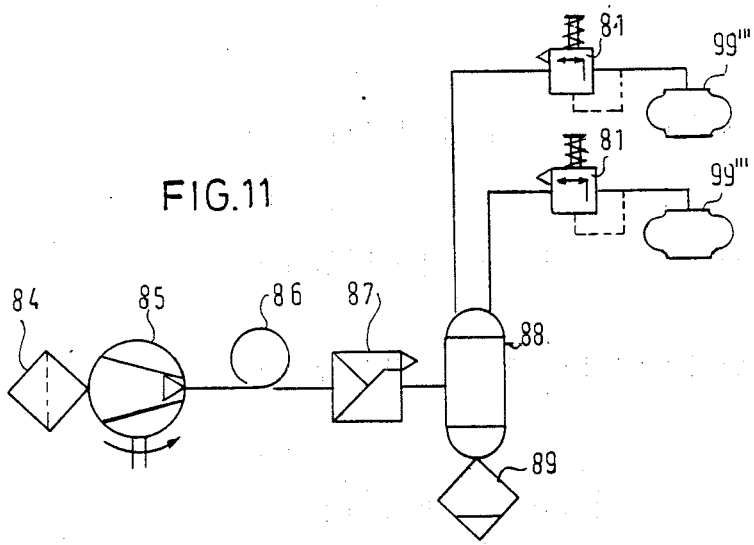
Figure 12:
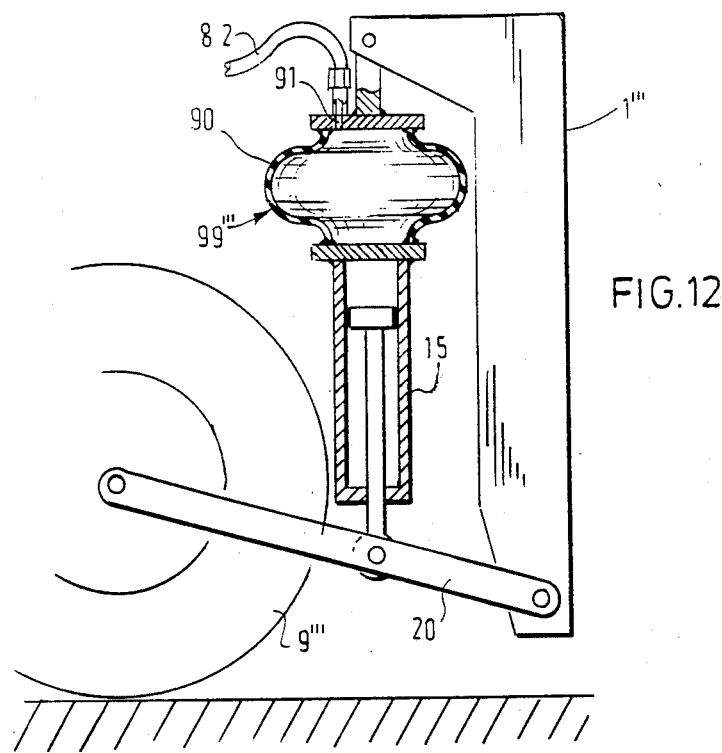
Figure 13:
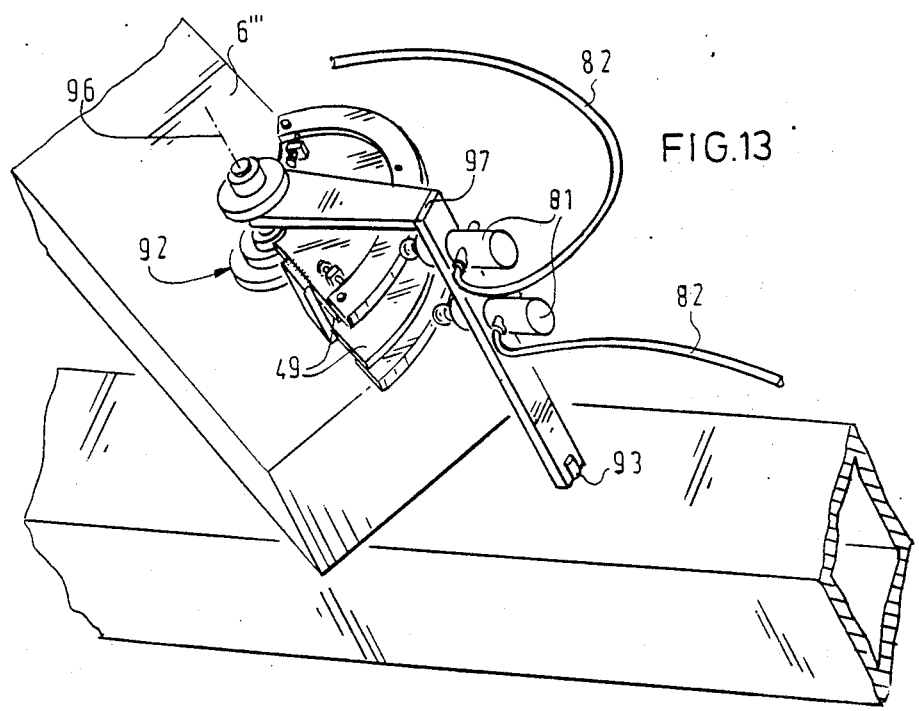

The drawing schematically shows in:

FIG. 1 a perspective rear view of a ground-wheel-supported agricultural implement formed by a mower drawn by an agricultural tractor, FIG. 2 a side elevation of the mower of FIG. 1, FIG. 3 a perspective view of the spring suspension of the ground wheels with respect to the frame of FIG. 1, FIG. 4 a detail of the hydraulic cylinders of the gas accumulator in the suspension shown in FIG. 3, FIG. 5 a vertical sectional view of the cylinders of the spring system, as in FIG. 3, FIG. 6 a perspective rear view like FIG. 1 of an alternative embodiment, FIGS. 7 and 8 each a perspective rear view of an embodiment having position correcting means for the drawbar, with respect to the frame, FIG. 9 a plan view of the angle detecting means used in the embodiment of FIGS. 7 and 8, FIG. 10 a perspective view of a second embodiment of the gas springs and the control-means, FIG. 11 an embodiment of the gas system for controlling the pressure prevailing in the gas springs, as in FIG. 10, FIG. 12 a detail XII of. FIG. 10, FIG. 13 a detail XIII of FIG. 10, FIGS. 14 and 15 a plan view of curve elements of FIGS. 10 and 12, FIGS. 16 to 18 three sectional views of the edges of the gas control-valve for controlling the gas pressure, FIG. 19 a diagram of a first embodiment of a ground-pressure measuring member and FIG. 20 a diagram of a first embodiment comprising a ground-pressure measuring member and a height meter.

Referring to FIG. 1, reference numeral 1 designates the frame of an agricultural implement, which frame may have any desired construction. In the lower part of the frame 1 is suspended a cutter bar 2, which bears on the ground by a skid 3. Above the cutter bar a set of crushing rollers 4 is arranged for crushing the cut crop. On the rear side of the device swath boards 5 are arranged for collecting the cut and crushed crop in a swath. The drive of the cutting members of the cutter bar 2 and the crushing rollers 4 takes place through a transmission in a drawbar 6 coupled with the frame 1 and passing to a tractor 7, the transmission in the drawbar being driven by the power take-off shaft 8 of the tractor.

The agricultural implement is carried by a set of ground wheels 9 on the rear side of the frame 1, at both ends thereof. Each ground wheel is rotatably fastened to an arm 10 pivotally coupled with the frame 1 and between the arm 10 and a support 11 of the frame, a spring system 12 is arranged, which serves herein at the same time for setting the height of the frame 1 with respect to the ground. By the spring system, in which each spring can be separately subjected to gas pressure, the pressure of the skid 3 on the ground is controlled, which will be explained further hereinafter with reference to FIGS. 3 to 5.

The spring system 12 mainly comprises a gas spring 99 formed by a hydraulic cylinder 13, the piston rod 14 of which is pivotally coupled with the support 11. There is furthermore provided a height setting cylinder 15, the piston rod 16 of which is pivotally coupled with the arm 10. The head ends of the two cylinders 13, 15 are fastened to a switching block 17 having channels for establishing a communication between the cylinders and various other members to be connected therewith.

One of said members is a gas accumulator 18 formed herein by a pressure vessel having a diaphragm 19. The diaphragm separates the gas section 20 from the fluid section 21 on the front and rear sides respectively of the diaphragm 19 of FIG. 4. The switching block 17 furthermore has a connection for a supply duct 22, which comes either from the main feed of the tractor or from a series-connected height setting cylinder of a spring system associated with a further ground wheel (see FIG. 3).

The switching block 17 furthermore has a connection for a pressure gauge 23 by which the fluid pressure in the hydraulic system can be assessed.

Finally the switching block 17 is provided with a screw member 24, which can be fixed in place by means of a nut 25. The screw member 24 ensures the separation between the channel 45 connecting the gas accumulator 18 with the pressure space in the cylinder 13 and the channel 46 establishing a connection between the feed duct 22 and the pressure space in the cylinder 15.

It is finally noted that each duct 22 can be closed by means of a manually actuated cock 26.

The height setting system arranged between the main feed duct 22 and the other spring system, that is to say, the left-hand system in FIG. 3 and FIG. 5 respectively, is provided with levelling means. For this purpose the piston 27 has an opening 29 that can be closed by a ball 28. The opening 29 provides a passage from the pressure space above the piston in the cylinder 15 to the pressure space below the same and hence by the duct 22 to the other cylinder 15. The opening 29 is closed by the ball 28 bearing on a seat 30, and respectively, on a seat 31 formed by a screwthreaded sleeve 32. In the screwthreaded sleeve 32 a pressure pin 33 is axially displaceable. On the opposite side of the ball 28 a second pressure pin 34 is axially displaceable in the piston head 27, which is provided with a transverse pin 35, which is displaceable up and down in a slot 36 of the piston head 27. The pin 35 extends on both sides in an annular socket 37 around the piston rod 16. The socket 37 is movable up and down along the height of the slot 36 along the head of the rod 16.

It will be obvious that the ball 28 is lifted from the seat concerned when either the pressure pin 33 or the pin 34 exerts pressure on the ball, which occurs on the one hand when the pin 33 in the top position of the piston 27 comes into contact with the top wall of the cylinder 15 and on the other hand when the piston 27 in the lower position comes into contact with the socket 37, which is previously pressed against the bottom of the piston 15. This means that in the outermost positions of the piston 27 in the cylinder 15 a communication is established between the pressure space of said cylinder and the feed duct 22 to the next cylinder.

The above-described spring system operates as follows:

Assuming the device to be in a position in which the skid 3 and the ground wheels 9 are fully bearing on the ground and the cocks to be open and the various cylinders to communicate freely with one another, the fluid supply to the system will first lift the frame 1, while the two height-setting cylinders 15 are uniformly filled with fluid until the cylinder head 27 and piston rod 16 is in the lowermost end position. Then the second cylinder 13 is filled against the gas pressure in the gas section 20 of the gas accumulator 18. The pressure can be read from the pressure gauge 23 when screw member 24 is turned open.

When fluid is sufficiently fed, the frame 1 is lifted to the maximum. The screw member 24 is then tightened so that the spring system and the lifting system are separated from one another. The pressure in the lifting system is subsequently relieved so that the frame 1 lowers to an extent such that the implement touches the ground. The spring cylinder is still filled to the maximum and the ground pressure is then adjustable by opening the screw member and by allowing such an amount of fluid to escape from the cylinder 13 that the desired ground pressure is obtained.

After closing and fixing the screw member, the spring system is permanently set, for example, for a clean machine. The spring characteristic is progressive. When the machine is fouled so that its weight is higher, the desired operational position of the piston 14 and the cylinder 13 has again to be set in the manner described above. Owing to the higher mean gas pressure in the accumulator the spring characteristic is now more progressive than in the case of the clean machine, which has a more advantageous effect in passing over cavities or bosses of the field. In the transport position, the frame 1 is lifted by the height setting cylinder. With the chosen geometry of wheel arm and height setting cylinder, the torque arm will decrease owing to the lifting operation (see FIG. 2) so that the spring cylinder will automatically leap out to the maximum, which contributes to the lifting height. Therefore, a smaller stroke of the height setting cylinder will be sufficient. In order to protect the hoses against breakdown, the cocks 26 can be closed during road transport. It is finally noted that both in the working position and on the road, the hydraulic system fed from the tractor may be without pressure.

FIG. 6 shows an alternative embodiment in which the height setting cylinder 40 is arranged centrally and is operative between the frame 1' and a lever 41. The lever 41 is connected with a rotatably journalled transverse shaft 42, which is coupled on both sides with each upper pivot arm 43 of the spring cylinder 44. The operation of the lifting spring system is the same but for a relief valve corresponding to the screw member 24 of FIGS. 1-5 which is provided only at the spring cylinder.

FIGS. 7, 8 and 9 show an embodiment in which the drawbar 6" is provided with compensating means by which the weight distribution among the ground wheels 9" on the lefthand and the right-hand side of the device resulting from the angular turn of the drawbar 6" with respect to the frame 1" can be compensated for, since the device may be in various positions behind the tractor, which results in an angular turn of the drawbar 6" and hence a lateral displacement of the center of gravity, which results in varying wheel pressures of the left-hand and the right-hand wheel or ground pressures at the left or right side.

At the rear end of the drawbar 6" in the proximity of the vertical rotary axis 50 thereof, the drawbar is equipped with angle detecting means 51 comprising a curve element 52 fastened to the drawbar 6", along which a follow-up roller 53 associated with control-means 98 can move. The follow-up roller 53 is rotatably journalled in a pivot arm 54, which is pivoted to the frame 1" at the pin 55 (see also detail FIG. 9). Near the follow-up roller 53 the pivot arm 54 is provided with a pivot joint 56 with the end of a piston rod 57 of a horizontal cylinder 58 arranged on the top of the frame 1". The cylinder 58 is in open communication with a narrower cylinder part 59 and is rigidly secured thereto. The cylinder part 59 is pivotally connected at 60 with the frame 1".

It should be noted that in this embodiment the gas accumulators 18" are arranged pairwise on the cylinder part 59 rather than directly on the first cylinder of the cylinder set between the pivot arm 10" of the ground wheel 9" and the frame 1". The cylinder part 59 communicates through a flexible duct 61 with the first cylinder 13". For the sake of completeness, it is stated that the flexible duct 61 communicates directly with the channel 45 (see FIG. 4). The function of the two gas accumulators 18" corresponds to those of the embodiment described above with reference to FIGS. 1 to 6.

The shape of the curve element 52 is determined in dependence on the path of displacement of the center of gravity so that at a given angular turn of the drawbar 6" the follow-up roller 53 is displaced with respect to the rotary axis 50 of the drawbar 6" to an extent such that more or less fluid can be fed as a compensating factor to the spring cylinder system 13", since the movement of the follow-up roller 53 produces a displacement of the piston rod 57 and hence a change of volume of the cylinder 58, 59. Thus, fluid is pressed out of the cylinder and passed through the flexible duct 61 to the cylinder 13" and conversely so that the compensation of a gas spring system in a ground wheel 9" can be obtained.

FIG. 7 shows a double compensation system arranged on both sides of the drawbar 6". Of course, a single compensation system may be provided as is shown in FIG. 8, when the drawbar 6" is subjected only to a limited angular turn of the frame 1" of the device so that compensation of the other side is not necessary.

In the second embodiment (see FIG. 10) the angle detecting means 51' is in the form of curve elements 80 to control the control-means 98" in the form of gas control-valves 81, which communicate through ducts 82 with gas springs 99'". The frame 1'" furthermore provided with an air filter 84, a compressor 85, a cooling duct 86, a regulator 87 and a gas reservoir 88 with a tap 89 for supplying gas, preferably air, to the gas control-valves 81 and the gas springs 99'".

This second embodiment also comprises gas springs 99'" having gas bags 90 and connections 91 for the gas to be supplied and height setting cylinders 15'" arranged by their head ends in contact with one another between a carrying arm 10'" and the frame 1'" (see FIG. 12). Moreover, the height setting cylinders 15'" of two ground wheels may again be arranged in series.

In dependence on the position of the drawbar 6'" the curve elements 80 depress a gas control-valve 81 to a greater or lesser extent which valve sets the pressure in the gas bags 90 to compensate for the displacement of the center of gravity (FIG. 13).

Preferably the curve elements 80 and the drawbar 6'" are journalled around the same center line 96. The curve elements 80 are rigidly secured to the drawbar 6'" by means of a bearing 92. The gas control-valves 81 are arranged on a carrier 97, which is retained at 93 without clearance or is fixed at 93 to the frame 1'".

Figure 14:
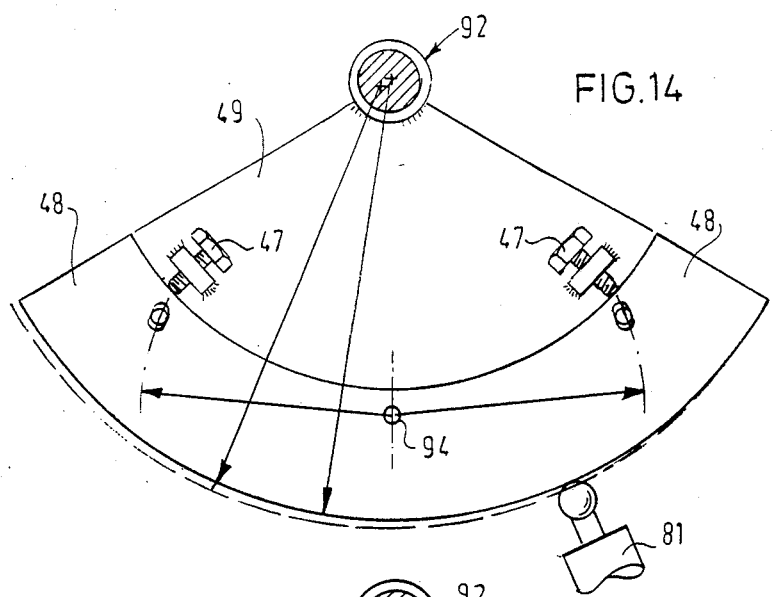
Figure 15:
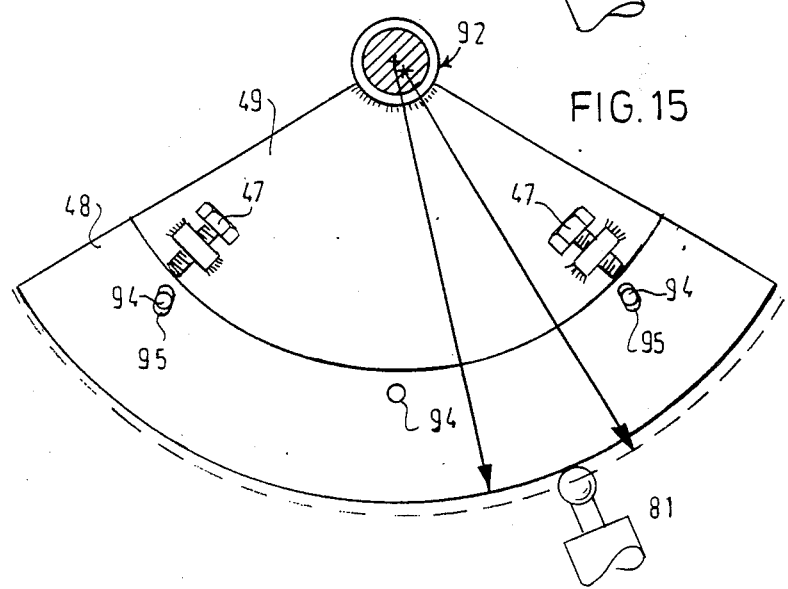
Figure 16:
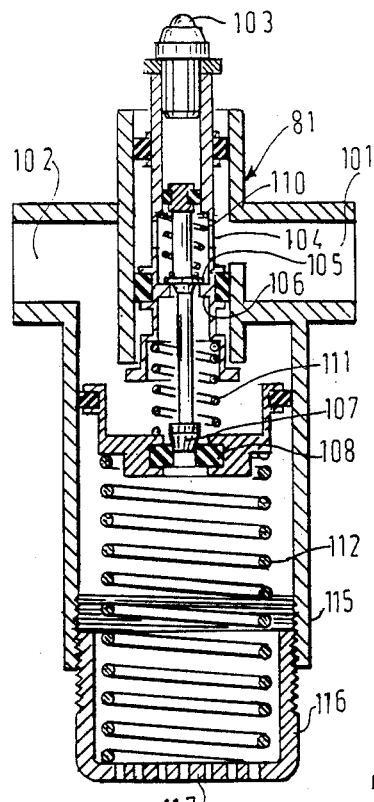
Figure 17:
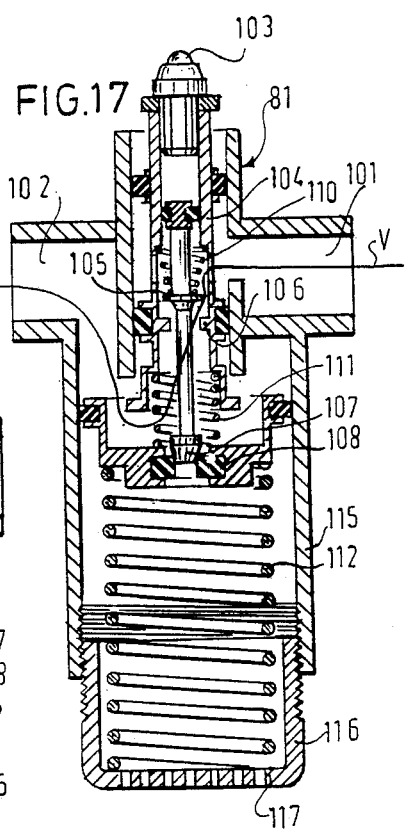
Figure 18:
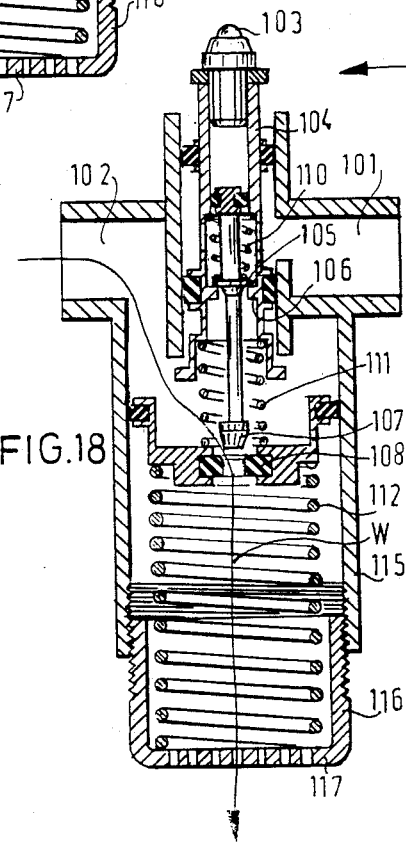

The curve elements 80 have a shape differing from a sector of a circle (FIGS. 14, 15): FIG. 14 shows the upper curve element 80 for setting the pressure for the left-hand ground wheel 9'" (viewed in the direction of movement) and FIG. 15 shows the lower curve element 80 for the right-hand wheel 9'". The curve elements 80 are fastened by means of screws 94 to plates 49.

Preferably the ends 48 of the curve elements 80 are adjustable by means of slots 95 in the ends 48 near the fastening screws 94. By tightening the fastening screws 94 or the guard screws 47 the position of the curve element 80 is fixed.

The gas control-valve 81 operates as follows (see FIGS. 16, 17, 18): When out of a state of equilibrium (FIG. 16) the curve element 80 depresses the ball 103, the inner housing 104 is moved downwards and the valve 105 is lifted from the seat 106 (FIG. 17) so that gas can flow in the direction of the arrow V from the inlet 101 to the outlet 102 towards the gas springs 99. When the pressure in the outlet 102 corresponds to the position of the curve element, this outlet pressure compresses the spring 112 so that valve 105 is again closed. When (as the case may be, out of another state of equilibrium) the ball 103 is moved slightly upwards, the outlet pressure lifts the valve 107 from the seat 108 (FIG. 18), but the valve 105 is retained on the seat 108 by the spring 110 so that the gas flows from the outlet 102 through a gas-pervious underside 117 of a cap 116 screwable in a housing 115 of the valve 81 until the pressure has attained a value such that the spring 112 again closes the valve 107. By turning the cap 116 the equilibrium pressure can be varied, which may be necessary for a fouled vehicle.

Further features defined in the claims may also be provided in the second embodiment.

Figure 19:
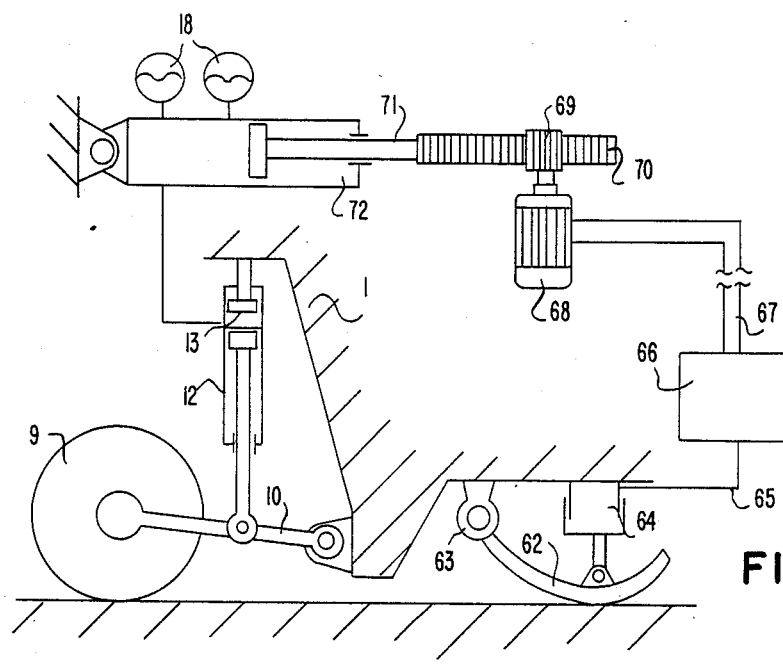
Figure 20:
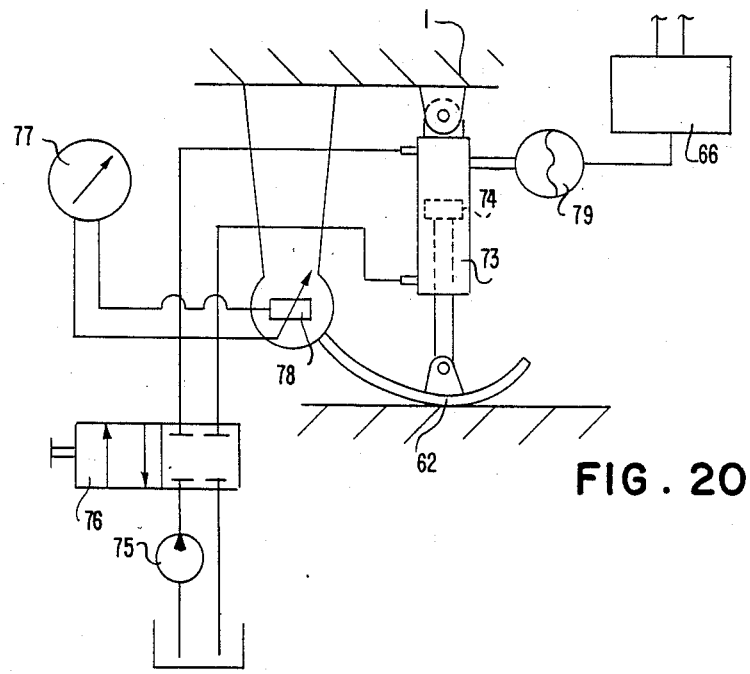

The invention proposes to permanently measure the ground pressure, which is schematically shown in FIGS. 19 and 20 for the embodiment of FIGS. 1 to 9.

The frame 1 is provided on the underside with a skid 62, which is pivotally connected at 63 with the frame 1. Between the skid 62 and the frame 1 a piston-cylinder system 64 of any kind is arranged, whose part fastened to the frame 1 communicates through a duct 65 with a converting element 66 for converting the fluid pressure into an electric signal, which controls a step motor 67 through a conductor 67. The step motor 68 drives a pinion 69, which co-operates with a toothed rack 70 arranged in line with a piston rod 71, of a compensation cylinder 72. The compensation cylinder 72 is provided with gas accumulators 18. The cylinder 72 is hydraulically connected in the manner described above with the piston system 12, 13 between the frame 1 and the arm 10 of the ground wheel 9.

With an increasing ground pressure, which means that the frame 1 gets nearer the ground, the skid 62 will reduce the contents of the cylinder 64, which results in an increase in pressure in the hydraulic system. This pressure is converted into an electric signal for controlling the step motor 68 in the desired sense, that is to say, the feed of fluid to the cylinder 13 so that the frame 1 is moved upwards. This correction can be performed fully automatically until the desired ground pressure is attained.

FIG. 20 shows an embodiment in which the cylinder 64 of the skid 62 is replaced by a double-acting hydraulic cylinder 73, by means of which the height of the frame 1 with respect to the ground can be set. This takes place by feeding fluid 73 to the space of the cylinder 73 above or below the piston 74 respectively with the aid of a pump 75 and a hydraulic control-valve 76. When once the desired height is set, which can be read from the meter 77 controlled by an angle position meter arranged around the pivotal shaft 63, for example, a potentiometer 78, the height is maintained, that is to say, the position of the piston 74 in the cylinder 73 is fixed. The pressure side of the cylinder 73 communicates with the converting element 66 of FIG. 19, which leads to a compensation system as shown in said figure. Between the cylinder 73 and the converting element 66 is arranged a hydraulical, pneumatical converter 79.

By means of the proposed system the height of the skid 62 can previously be accurately adjusted with respect to the frame 1, after which the desired ground pressure is set by means of the main spring system shown in the preceding figures. Therefore, by means of such an arrangement not only the working height of the implement relative to the ground can be accurately maintained, but also the ground pressure. The proposed system provided with the ground pressure meter and the height gauge can also be used in the second embodiment shown in FIGS. 10 to 18.

The invention is not limited to the embodiments described above. For example, the agricultural implement may be replaced by any other kind of vehicle comprising a soil cultivating member or the like.

The curve elements 80 may be mounted elsewhere in the system, wherein they are connected indirectly with the drawbar 16 such that the rotation of the curve-element corresponds to the rotation of the bar.

Instead of a spring-suspended frame as disclosed in the present detailed description, it is possible within the scope of the invention, to suspend the ground-working implement by means of springs on the frame.

What is claimed is:

1. A vehicle comprising a frame having ground engaging wheel means and an agricultural implement, lifting means for supporting said implement in elevated relation to the ground and gas spring means for supporting said implement relative to the ground, said gas spring means comprising a plurality of gas springs in which the prevailing gas pressures may be different, control means for controlling the pressures prevailing in said gas springs, said vehicle including a drawbar pivoted to said frame and angle-detecting means for detecting the angle between the drawbar and the frame and governing said control means.

2. A vehicle as defined in claim 1 wherein said angle detecting means comprises at least one curve element.

3. A vehicle comprising a frame having ground engaging wheel means and an agricultural implement, lifting means for supporting said implement in elevated relation to the ground and gas spring means for supporting said implement relative to the ground, said gas spring means comprising a plurality of gas springs in which the prevailing gas pressures may be different and a plurality of gas accumulators with each of said gas accumulators associated with one of said gas springs, said lifting means comprising a hydraulic piston/cylinder assembly and at least one of said gas accumulators being in communication therewith, control means for controlling the pressures prevailing in said gas springs, said control means including a feed source of pressurized fluid in communication with said hydraulic piston/cylinder assembly, said feed source being a hydraulic cylinder.

4. A vehicle comprising a frame having ground engaging wheel means and an agricultural implement, lifting means for supporting said implement in elevated relation to the ground and gas spring means for supporting said implement relative to the ground, said gas spring means comprising a plurality of gas springs in which the prevailing gas pressures may be different, control means for controlling the pressures prevailing in said gas springs, said lifting means comprising two hydraulic piston/cylinder assemblies and said control means comprising at least two curve elements, one for each of said hydraulic piston/cylinder assemblies, the pressure spaces of said assemblies being in communication, a switching block arranged between the head ends of the gas springs and said assemblies, one of said gas springs including a gas accumulator in the form of a pressure vessel having a fluid section and a gas section separated by a diaphragm and the fluid section being in communication with said switching block.

* * * * *